No. 696,059. Patented Mar. 25, 1902.
F. LINE.
AIR CONDUCTING PIPE.
(Application filed June 27, 1899.)
(No Model.)
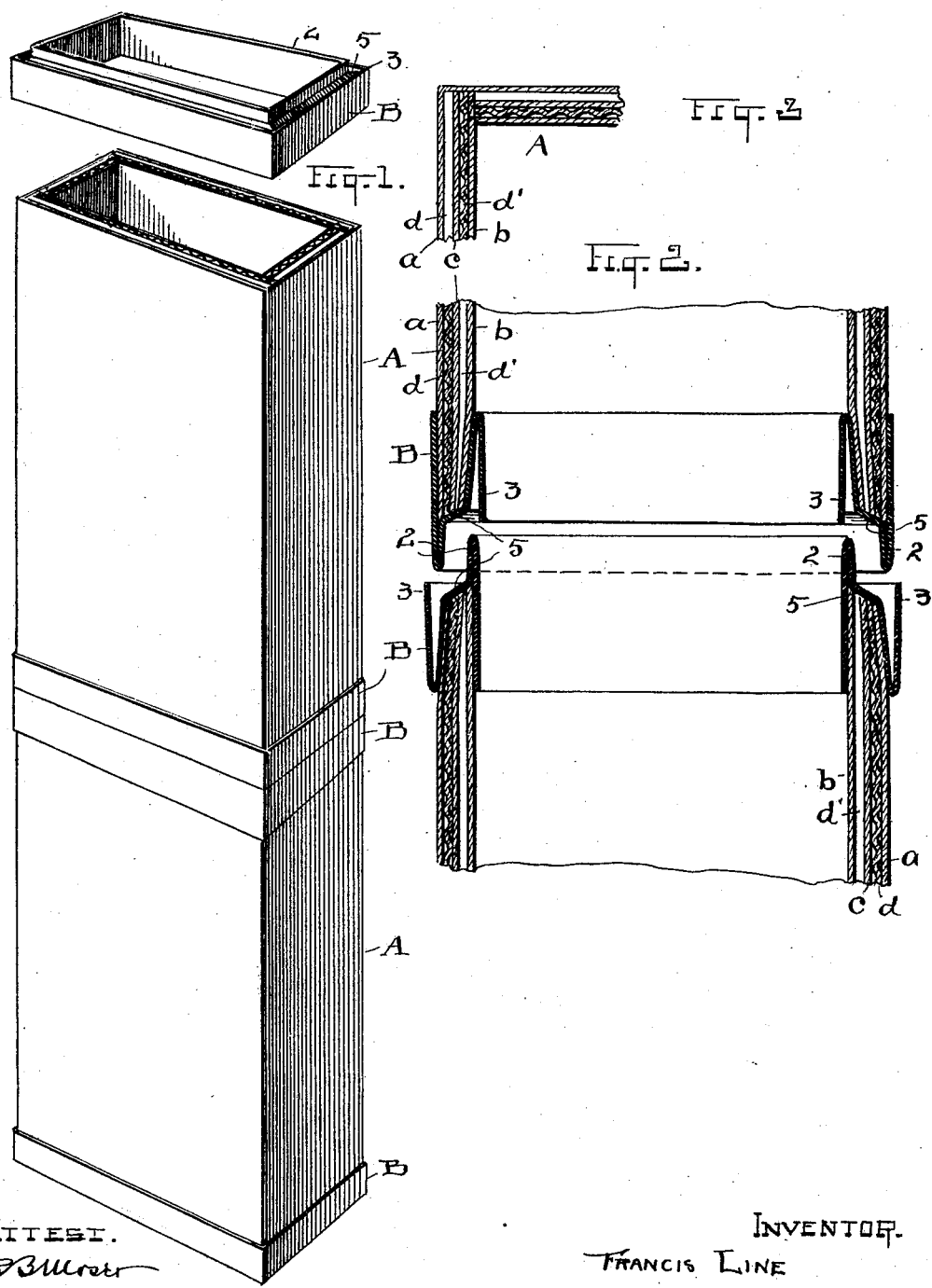
ATTEST.
INVENTOR.
FRANCIS LINE
BY V. T. Fisher
ATTY

UNITED STATES PATENT OFFICE.

FRANCIS LINE, OF CLEVELAND, OHIO.

AIR-CONDUCTING PIPE.

SPECIFICATION forming part of Letters Patent No. 696,059, dated March 25, 1902.

Application filed June 27, 1899. Serial No. 722,050. (No model.)

*To all whom it may concern:*

Be it known that I, FRANCIS LINE, a citizen of the United States, residing at Cleveland, in the county of Cuyahoga and State of Ohio, have invented certain new and useful Improvements in Air-Conducting Pipes; and I do declare that the following is a full, clear, and exact description of the invention, which will enable others skilled in the art to which it appertains to make and use the same.

My invention relates to air-conducting pipes, and is more particularly designed to take the place of the furnace-pipes now in common use, but may be used for cold air and other purposes as it may be found applicable.

In furnace-pipes in which ventilation is relied upon for safety the old construction requires a pipe with two walls of tin or other sheet metal separated sufficiently to afford an air circulating or ventilating space between them and with such construction at the ends of the pipe-sections as will extend and keep open the course of ventilation from section to section throughout the line of pipe. Hence the circulation of air in these pipes is chiefly relied upon to protect the wall from overheating through them. It has been found, however, that such circulation or ventilation often is very imperfect and, indeed, not infrequently so defective that the air-passages become closed up entirely by one reason or another, such as faulty work in placing the pipes or by their becoming clogged in the air-passages. As a result of this it frequently occurs, especially in extremely cold weather when the fires are unusually hot, that the heat strikes through and starts a fire in the adjacent wall. The fault of this may not be one of bad workmanship so much as in the faulty construction of the pipes and their defective operation.

My invention has as one of its special objects the production of a wall-pipe to substitute all pipes wherein such dangerous results are possible and which is proof against danger in this way or on any such account. My pipe is not dependent on an operation which can easily be checked or entirely stopped, but has inherent qualities and resistances which are the guarantee of its security. To these ends I have produced a pipe in which a non-conducting material is employed both in lieu of the double tin or sheet-metal wall and of the air-space between them, all substantially as shown and described, and particularly pointed out in the claim.

In the accompanying drawings, Figure 1 is a perspective elevation of a set of pipe-joints embodying my invention and showing at the top separately a joint or union which belongs on its end. Fig. 2 is a vertical sectional elevation of the adjacent ends or portions of two pipe-joints separated to promote clearness of outline, but also near enough to show how one member will closely fit in the other when brought together. Fig. 3 is a cross-section of a part of one of the pipe-sections.

A represents one of my new and improved pipe sections or parts, which may be square, as here shown, or round, or, indeed, of any desired form and is constructed throughout its body of a suitable non-combustible and non-conducting material, preferably of asbestos, and preferably also in cellular formation— that is, while I may prepare the body of the pipe so as to be practically solid throughout and of suitable thickness or weight of stock to make it absolutely heat-proof in wooden walls or for use in leading from the furnace to the wall I prefer to make it of cellular form and of a depth which will occupy relatively about the same space as the old-fashioned wall-pipe. This style of pipe I find is also preferred by the user, as its security against fire is so obvious.

In the style of pipe shown here there are three sheets $a$, $b$, and $c$, spaced equally apart by the ribbed or fluted intermediate portions $d$ and $d'$, thus making a double cellular structure. It might be single, and the cells might be produced by other than fluted material. With the flutes $d$ and $d'$ running at right angles to each other the body of the pipe is made exceptionally firm and rigid, and to promote flow of air through the pipe the interior surface may be glazed.

Assuming that the pipe-sections are made the usual lengths or longer or shorter, as may be preferred, they each are provided at their ends with couplings or overlapping joints B, as shown. These joints are built in or upon the ends of the pipes, so as to become mechanically and commercially an essential part thereof, and are so fashioned that they each have a tongue 2 and an overlapping flange 3, reverse as to each other where they come together, but alike otherwise. They also each have an inclined shoulder 5 between the tongue and flange which are supposed to meet when the pipe-sections are seated, thus altogether making a very close joint where the sections meet.

I have named asbestos as a material adapted to my use; but I do not confine myself thereto and include mineral wool and all equivalent fibrous non-combustible and non-conducting insulating materials.

What I claim is—

As a new article of manufacture, a hot-air pipe formed of a series of plain asbestos tubes and corrugated asbestos filling the space between said tubes, whereby air-cells are formed in the pipe between the tubes, and a joint for connecting the tubes comprising two members each provided with an inner and outer vertical portion, connected by an inclined portion having a shoulder, and inner and outer oppositely-disposed recesses, the inner recess adapted to receive the ends of the tubes, and the outer recess adapted to receive the outer vertical portion of the opposite member of the joint, substantially as described.

Witness my hand to the foregoing specification this 13th day of June, 1899.

FRANCIS LINE.

Witnesses:
H. E. MUDRA,
R. B. MOSER.